US009663202B2

(12) United States Patent
Sylvester

(10) Patent No.: US 9,663,202 B2
(45) Date of Patent: May 30, 2017

(54) SAFETY, RESCUE, AND RECOVERY APPARATUS AND METHOD

(71) Applicant: WATER RESCUE INNOVATIONS, INC., Superior, WI (US)

(72) Inventor: Connie Sylvester, Duluth, MN (US)

(73) Assignee: Water Rescue Innovations, Inc., Duluth, MN (US)

(*) Notice: Subject to any disclaimer, the term of this patent is extended or adjusted under 35 U.S.C. 154(b) by 0 days.

(21) Appl. No.: 14/815,139

(22) Filed: Jul. 31, 2015

(65) Prior Publication Data

US 2016/0083057 A1 Mar. 24, 2016

Related U.S. Application Data

(60) Provisional application No. 62/071,323, filed on Sep. 22, 2014.

(51) Int. Cl.
B63C 9/08 (2006.01)
B63C 9/15 (2006.01)
B63C 9/20 (2006.01)
B63C 9/19 (2006.01)
B63C 9/18 (2006.01)
B63C 9/13 (2006.01)

(52) U.S. Cl.
CPC ............... B63C 9/155 (2013.01); B63C 9/08 (2013.01); B63C 9/18 (2013.01); B63C 9/19 (2013.01); B63C 9/20 (2013.01); B63C 2009/084 (2013.01); B63C 2009/131 (2013.01)

(58) Field of Classification Search
CPC .. B63C 9/08; B63C 9/15; B63C 9/155; B63C 9/16; B63C 9/19; B63C 9/20; B63C 9/24; B60C 29/00

USPC ................. 441/80, 81, 89, 92, 122
See application file for complete search history.

(56) References Cited

U.S. PATENT DOCUMENTS

| 149,513 A | 4/1874 | Ormsbee |
| 1,154,842 A | 9/1915 | Butusov |
| 1,611,427 A | 12/1926 | Evans |
| 4,000,534 A * | 1/1977 | Cerniway ................ B63C 9/24 |
| | | 405/186 |
| 4,694,931 A | 9/1987 | Sibertin-Blanc et al. |
| 4,894,036 A | 1/1990 | Switlik |
| D357,722 S | 4/1995 | Fireman |
| 5,724,025 A | 3/1998 | Tavori |
| 6,069,557 A | 5/2000 | Anglin et al. |

(Continued)

FOREIGN PATENT DOCUMENTS

CN        203512005        4/2014

OTHER PUBLICATIONS

Translation of CN 203512005.

Primary Examiner — Lars A Olson

(57) ABSTRACT

A safety, rescue, and recovery device that compressively secures to a limb of a user when inflated. The device can be easily adjusted to be negatively buoyant, neutrally buoyant, or positively buoyant before inflation depending on whether the application is safety, rescue, or recovery. The device may also be integrated into an article of clothing for certain applications. An elongated handle is attached to the device to provide a sliding attachment point for a rescue rope that automatically reduces torque applied to the limb of the user. Consequently, a rescue force applied to the rescue rope can act at a variety of angles along an arc relative to the device.

20 Claims, 21 Drawing Sheets

(56) References Cited

U.S. PATENT DOCUMENTS

| | | |
|---|---|---|
| 6,186,967 B1 | 2/2001 | Messina |
| 6,219,852 B1 | 4/2001 | Bain et al. |
| 6,416,471 B1 | 7/2002 | Kumar et al. |
| 6,533,626 B2 | 3/2003 | Pons |
| 6,568,976 B2 | 5/2003 | Anderson et al. |
| 6,679,743 B1 | 1/2004 | Gerber |
| 6,926,570 B1 | 8/2005 | Cortez et al. |
| 7,047,966 B2 | 5/2006 | Stewart |
| 7,181,192 B2 | 2/2007 | Panasik et al. |
| 7,347,757 B1 | 3/2008 | Lanthier |
| 7,517,268 B2 | 4/2009 | Pehling |
| 8,011,019 B1 | 9/2011 | Hamid et al. |
| 8,295,445 B2 | 10/2012 | Nguyen et al. |
| 8,527,038 B2 | 9/2013 | Moon et al. |
| 8,613,637 B2 | 12/2013 | Puls et al. |
| 8,790,147 B2 | 7/2014 | Senn et al. |
| 8,911,273 B2 | 12/2014 | Chouinard et al. |
| 2013/0295804 A1 | 11/2013 | Senn |
| 2013/0331058 A1 | 12/2013 | Harvey |

* cited by examiner

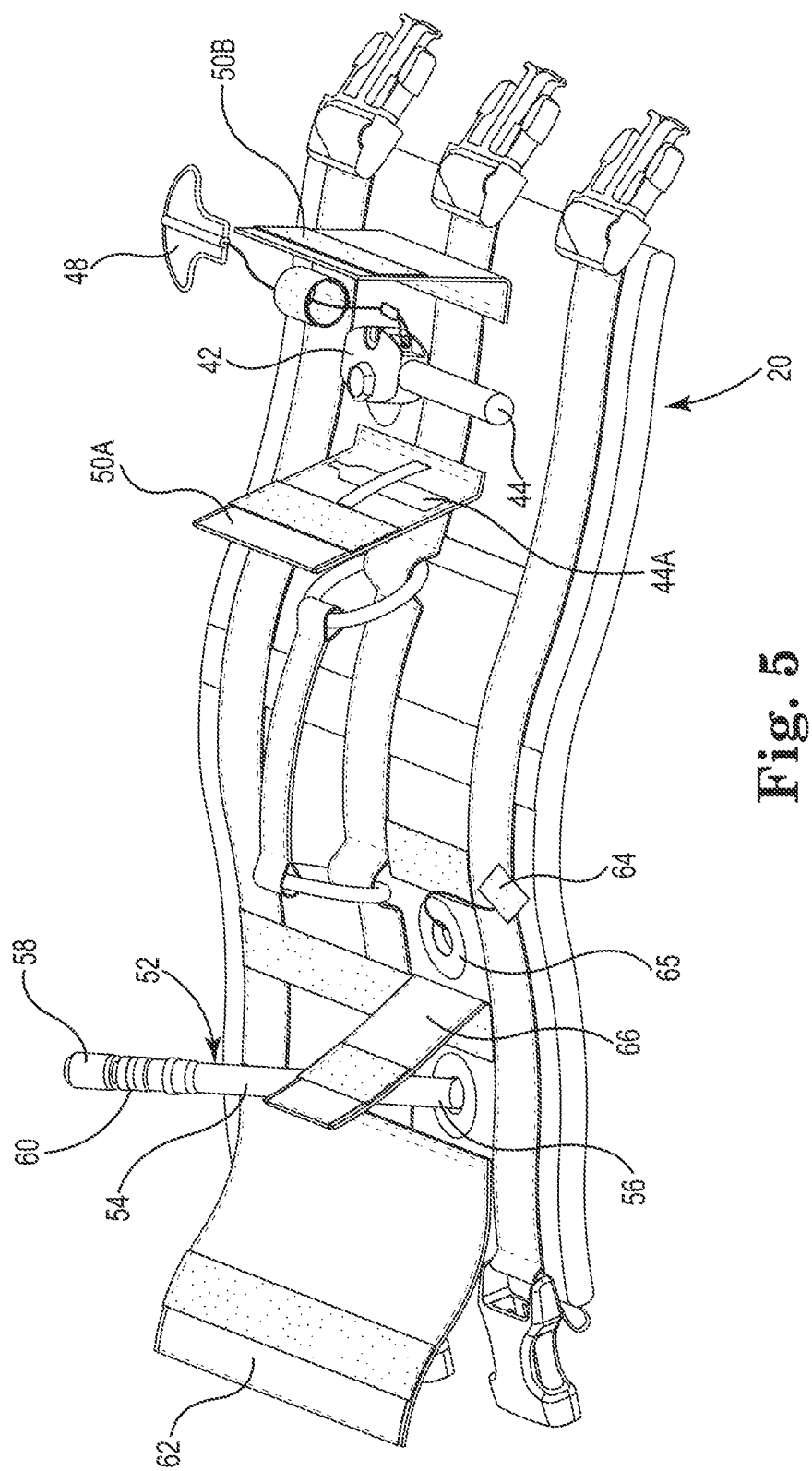

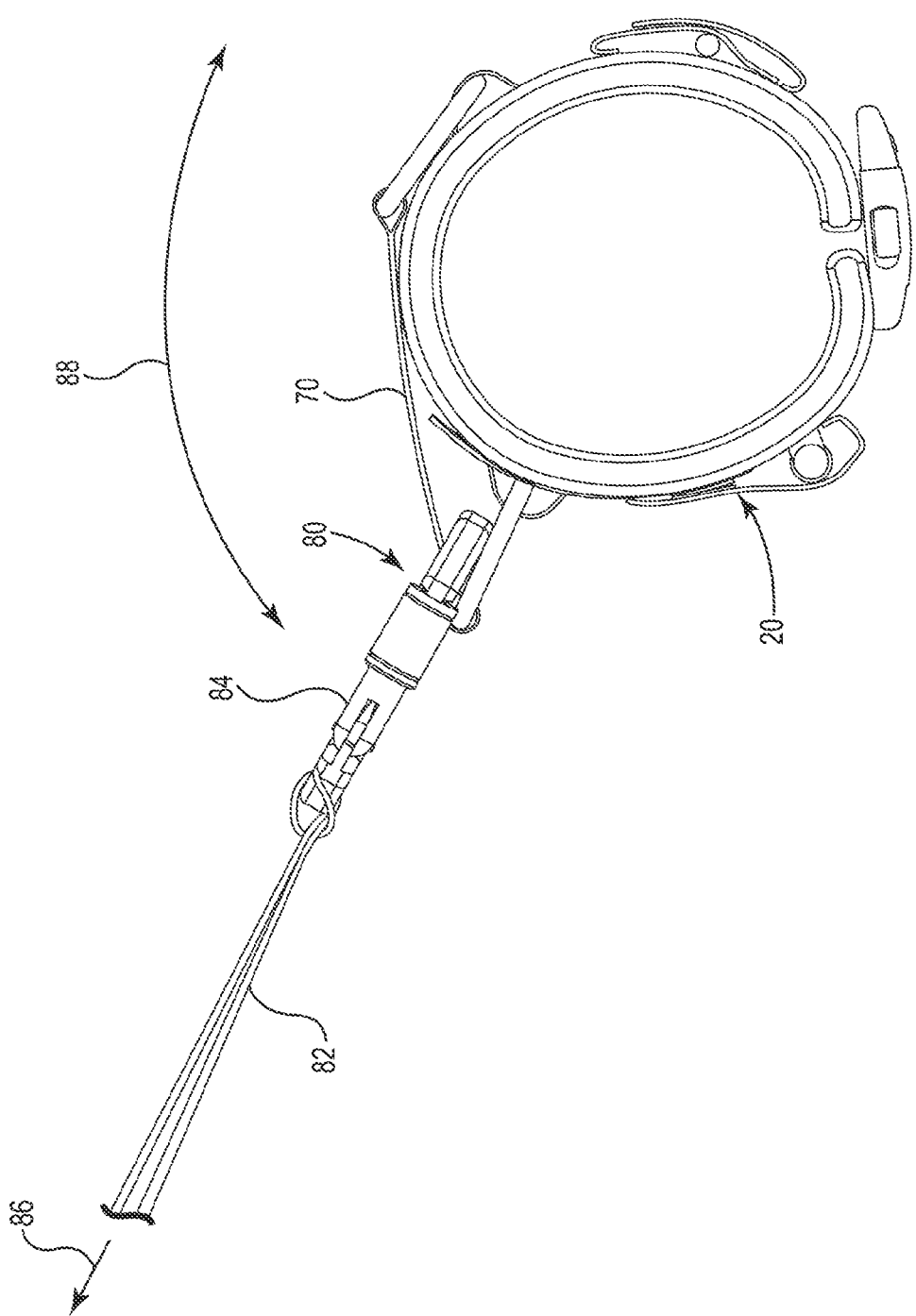

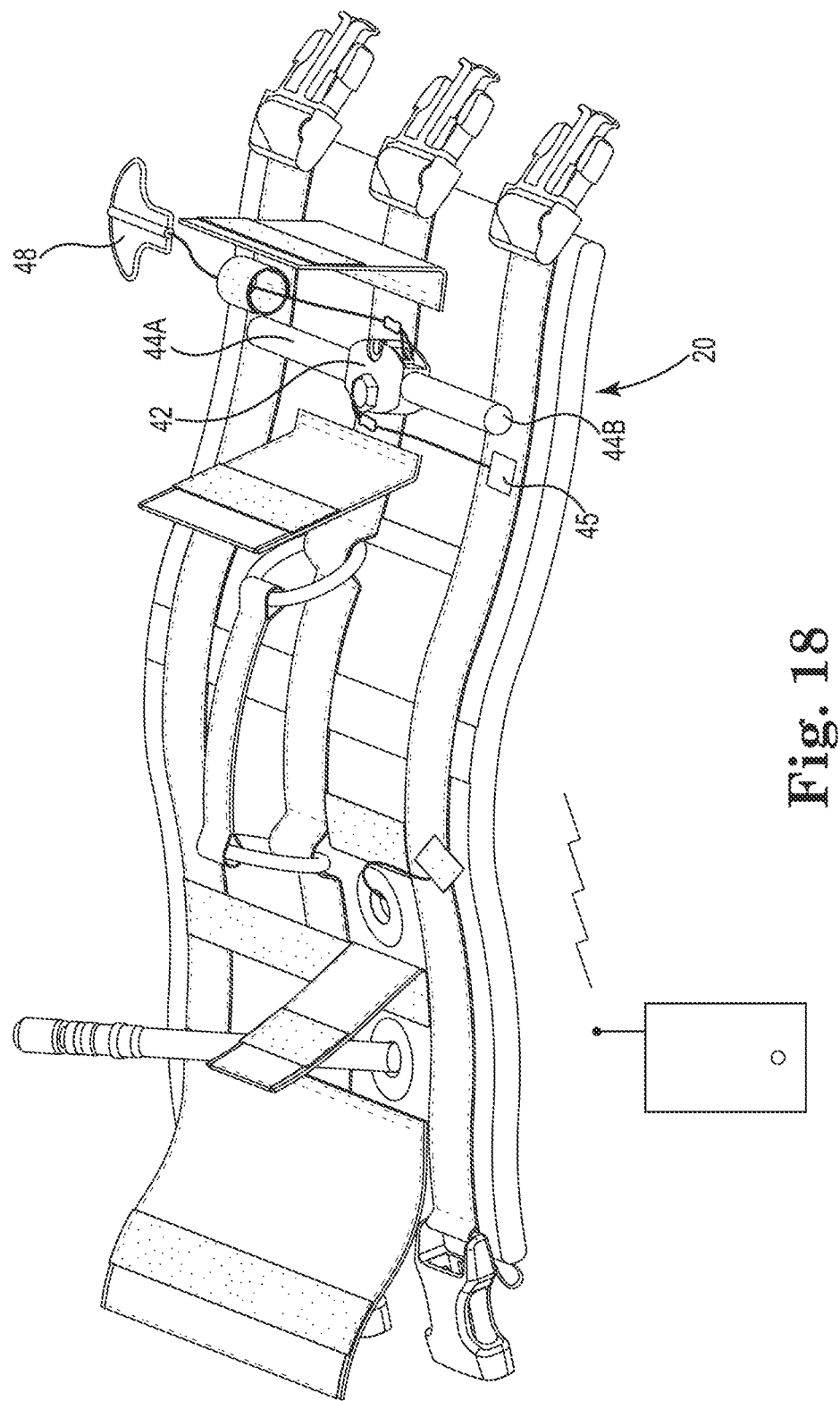

SAFETY, RESCUE, AND RECOVERY APPARATUS AND METHOD

CROSS-REFERENCE TO RELATED APPLICATIONS

The present application claims the benefit of U.S. Provisional Application No. 62/071,323, filed Sep. 22, 2014, the entire disclosure of which is hereby incorporated by reference.

FIELD OF THE INVENTION

The present disclosure relates to a safety, rescue, and recovery device that compressively secures to a limb of a person or an animal when inflated. The device can be easily adjusted to be negatively buoyant, neutrally buoyant, or positively buoyant before inflation depending on whether the application is safety, rescue, or recovery. The device may also be integrated into an article of clothing for certain applications.

BACKGROUND OF THE INVENTION

Various inflatable devices are known for safety and rescue applications, such as disclosed in U.S. Pat. No. 357,722 (Fireman); U.S. Pat. No. 149,513 (Ormsbee); U.S. Pat. No. 6,186,967 (Messina); U.S. Pat. No. 6,533,626 (Pons); U.S. Pat. No. 6,568,976 (Anderson et al.); U.S. Pat. No. 6,679,743 (Gerber); 6,926,570 (Cortez et al.); and U.S. Pat. No. 7,347,757 (Lanthier). Most of the devices disclosed in these patents have had little or no commercial success for a variety of reasons.

BRIEF SUMMARY OF THE DISCLOSURE

The present disclosure relates to a safety, rescue, and recovery device that compressively secures to a limb of a person or an animal (persons and animals collectively referred to as the "user") when inflated. The device can be easily adjusted to be negatively buoyant, neutrally buoyant, or positively buoyant before inflation depending on whether the application is safety, rescue, or recovery. The device may also be integrated into an article of clothing for certain applications. An elongated handle is attached to the device to provide a sliding attachment point for a rescue rope that automatically reduces or minimizes torque applied to the limb of the user. Consequently, a rescue force applied to the rescue rope can act at a variety of angles along an arc relative to the device.

In one embodiment, the safety and rescue device includes an inflatable bladder generally shaped like a hollow cylinder having a first end, a second end, and a longitudinal passageway extending between the first end and the second end. The longitudinal passageway has a cross-sectional opening sized to receive a limb of a user. A protective covering substantially surrounds the inflatable bladder. The self-contain inflation system provided includes an inflator assembly with a gas canister to inflate the bladder and a manual inflation assembly to manually inflate the bladder if needed. The inflated bladder in the inflated configuration compressively attaching the safety and rescue device to the limb of the user. An elongated handle includes first and second ends attached to the protective covering providing a sliding attachment point for a rescue rope that automatically reduces or minimizes torque applied to the limb of the user.

The elongated handle can be oriented in any direction, but is generally perpendicular or parallel to the longitudinal passageway. A rescue force applied by a rescue rope can act on the safety, rescue and recovery device at a variety of angles anywhere along an arc. The arc preferably extends about 60 degrees, and more preferably about 90 degrees, around the longitudinal axis of the longitudinal opening.

The safety and rescue device can extend along a portion of a limb or the full length of the limb. For example, one embodiment of the present device extends the full length of the user's arm.

For some applications, the safety and rescue device is positively buoyant before the compressed gas is released from the gas canister so it floats. For some recovery applications, the present safety and rescue device is neutrally or negatively buoyant before being inflated so it can be carried by a diver under water.

The protective covering may include one or more of a fire retardant material, a highly reflective material, or embedded photovoltaic cells that generate electricity when exposed to light. Stiffening members are optionally used to retain the inflatable bladder in a generally cylindrical shape before inflation.

In one embodiment, the protective covering is a sleeve of a garment. One or more of the inflator assembly, gas canister, the manual inflation assembly, or the elongated handle are optionally attached to the garment at a location remote from the inflatable bladder.

The manual inflator assembly may also be used to release air from the inflatable bladder. For recovery applications the manual inflator assembly may be omitted.

An emergency beacon is preferably attached to the protective covering. The emergency beacon can be manually activated or automatically activated when the device is inflated or exposed to water. The emergency beacon can be one or more of a light source, an audible alarm, a radio transmission, or release of a chemical marker.

Medical sensors can also be included in the longitudinal passageway to monitor vital signs of the user. An RF transmitter preferably sends the data about the user's vital signs to the rescue team.

The present disclosure is also directed to a method of using safety and rescue device attachable to a limb of a user. The method includes positioning the limb of the user in a longitudinal passageway of a protective covering. The protective covering has a shape generally like a hollow cylinder with a first end and a second end at opposite ends of the longitudinal passageway. A self-contained inflation system is then activated to release a compressed gas from a gas canister to inflate an inflatable bladder contained in the protective covering. The inflated bladder in the inflated configuration compressively attaching the safety and rescue device to the limb of the user. A rescue rope is attached to an elongated handle on the device. The elongated handle provides a sliding attachment point for the rescue rope. Tension is applied to the line to retrieve the user. The sliding attachment point permitting the user to rotate relative to a tension axis of the line during retrieval to automatically reduce or minimize torque applied to the limb of the user.

BRIEF DESCRIPTION OF THE SEVERAL VIEWS OF THE DRAWING

FIGS. 4 and 5 are perspective views of the device of FIG. 1 in flattened configurations.

FIGS. 6A and 6B illustrate operation of sliding attachment points on the device of FIG. 1 in accordance with embodiments of the present disclosure.

FIG. 18 is a perspective view of an alternate embodiment of the device with dual gas canisters in accordance with an embodiment of the present disclosure.

DETAILED DESCRIPTION

Figure 1:
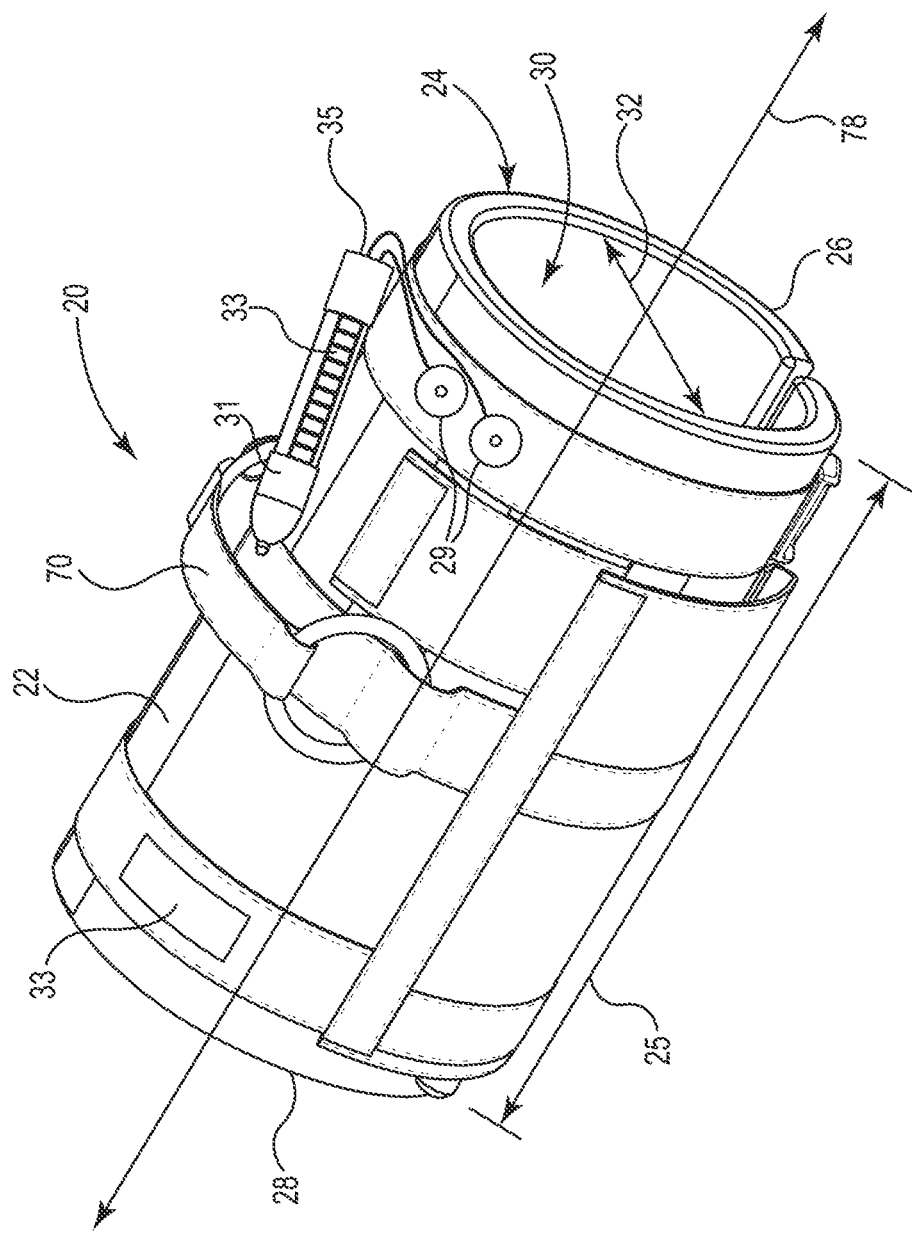
FIG. 1 is a perspective view of a safety, rescue and recovery device in accordance with an embodiment of the present disclosure.
Figure 2:
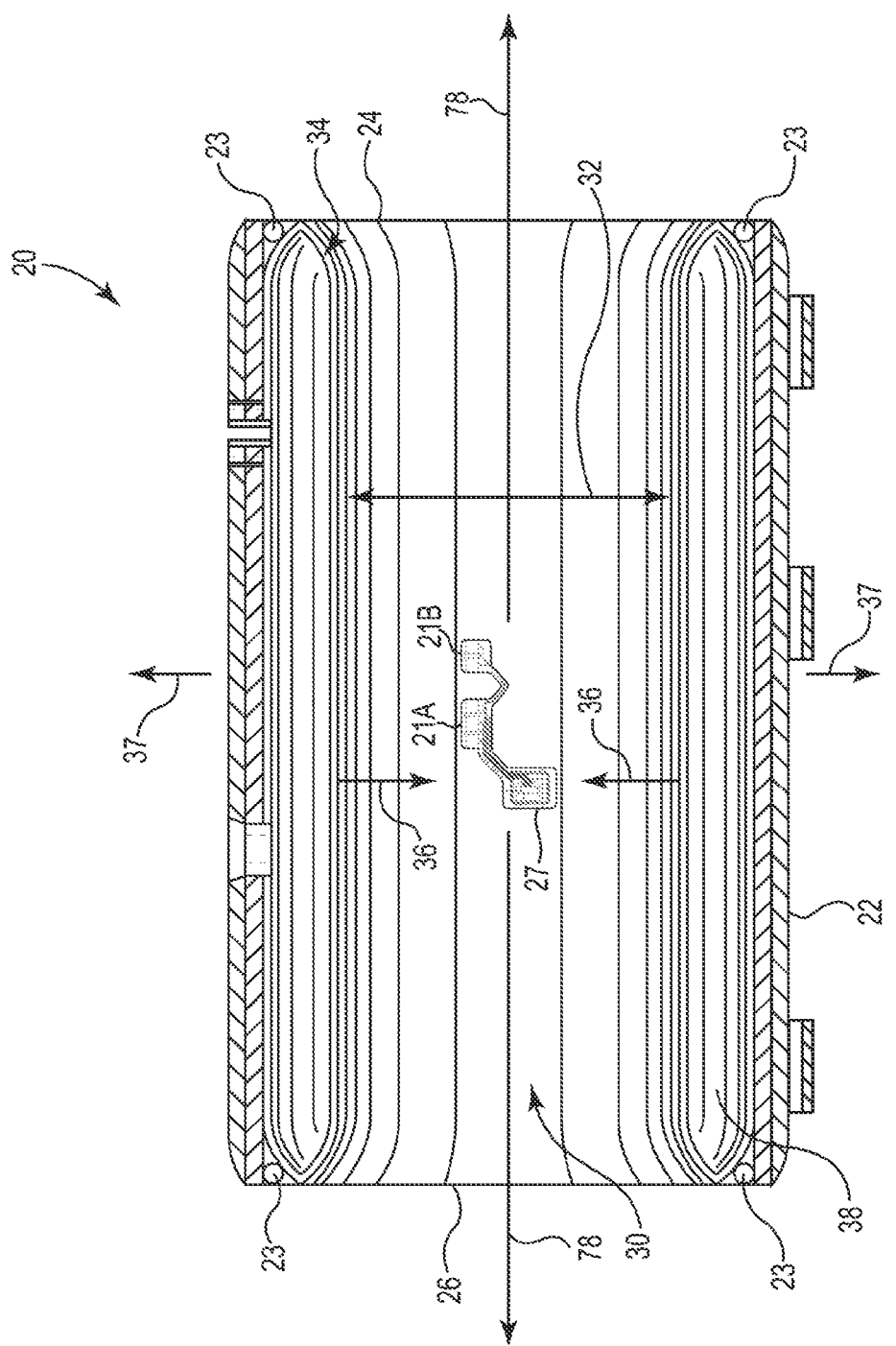
FIG. 2 is a longitudinal cross-sectional view of the device of FIG. 1.
Figure 3:
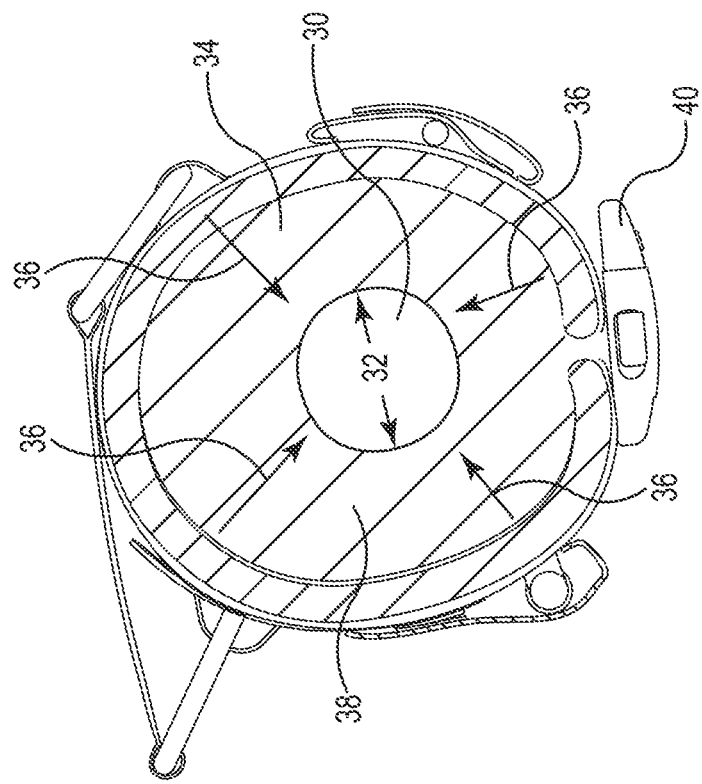
FIG. 3 is an end view of the device of FIG. 1 in an inflated configuration in accordance with an embodiment of the present disclosure.

FIGS. 1-3 are various views of a safety, rescue and recovery device 20 that inflates to compressively attach to the limb of a user (see e.g., FIGS. 15 and 16) in accordance with an embodiment of the present disclosure. The term "user" is used herein to generically refer to humans and other animals as the context requires.

In the illustrated embodiment, protective covering 22 is generally shaped like a hollow cylinder 24 having a first end 26, a second end 28, and a longitudinal passageway 30 extending between the first and second ends 26, 28. The longitudinal passageway 30 has a cross-sectional opening 32 sized to receive the limb of the intended user.

The distance between the first and second ends 26, 28 is dependent on the particular application. In an embodiment where the device 20 is intended to extend along the forearm of the user, the length 25 may be on the order of about 8 inches to about 14 inches. In other embodiments, the device 20 can extend the entire length of the limb. (e.g., FIGS. 12 and 13). The device 20 can also serve secondary purposes, such as functioning as a splint to immobilize the limb of the wearer.

The device 20 preferably includes emergency beacon 31 attached to the protective covering 22. In one embodiment, the emergency beacon 31 is automatically activated when the compressed gas 46 is released from the gas canister 44 (see FIG. 5) or when the beacon 31 contacts water. For example, the emergency beacon 31 is activated when lanyard 48 (see FIG. 5) is pulled or when the indicator tab 148 is severed.

The emergency beacon 31 can include one or more of a light source, an audible alarm, a radio transmission, a chemical marker that is released into the water, or a combination thereof. In one embodiment, photovoltaic cells 33 are embedded in the protective covering 22 or on the emergency beacon 31 to generate electricity when exposed to light to power the emergency beacon 31. Suitable emergency beacons are disclosed in U.S. Pat. No. U.S. Pat. No. 6,069,557 (Anglin et al.); U.S. Pat. No. 7,181,192 (Panasik et al.); U.S. Pat. No. 8,295,445 (Ngyyen et al.); and U.S. 2013/0331058 (Harvey), which are hereby incorporated by reference.

As best illustrated in FIG. 2, the protective covering 22 substantially surrounds inflatable bladder 34. The inflatable bladder 34 also preferably has a cylindrical shape generally corresponding to the shape of the protective covering 22. The embodiment of FIG. 2 illustrates the inflatable bladder 34 before inflation. As will be discussed in detail herein, the inflatable bladder 34 may be used with a variety of different coverings or without a protective covering.

The protective covering 22 can be made from a variety of synthetic materials, natural materials, or composites thereof, such as for example, nylon. For fire rescue applications the protective covering 22 preferably has fire retardant properties.

In one embodiment, the device 20 includes fixed sensors 21A, 21B ("21") located in the longitudinal passageway 30 that monitor vital signs of the user, such as for example, blood pressure, temperature, heart rate, respiratory rate, and the like, or that monitor environmental factors, such as water temperatures, acceleration of the device 20, pressure on the user's limb, and the like. The fixed sensors 21 are preferably coupled to a wireless transmitter 27 that communicates wirelessly with the beacon 31, which preferably wirelessly transmits sensor data to the rescue team. Suitable medical and environmental sensors 21 are disclosed in U.S. Pat. No. 5,724,025 (Tavori); U.S. Pat. No. 6,416,471 (Kumar); and U.S. Pat. No. 8,527,038 (Moon), which are hereby incorporated by reference.

In an emergency situation where a user self-apply the device 20 it is likely that only the fixed sensors 21 will be available. In situations with a rescuer applies the device 20 to the user, the rescuer can attach movable sensors 29 to the user's body, such as disclosed in U.S. Pat. No. 8,527,038. These moveable sensor 29 are preferably tethered to the beacon 31 by wires and are attached to the device 20 using a pressure sensitive adhesive. The rescuer peals the moveable sensors 29 from the device 20 and attaches them to the user's body using the adhesive. In one embodiment, the beacon 31 includes spools of wire 35 that deploy as the rescuer positions the moveable sensors 29 on the user.

As illustrated in FIG. 3, when a compressed gas, such as CO2, is delivered to the interior space 38 the inflatable bladder 34, the protective covering 22 constrains radial outward expansion in direction 37 and forces the expansion to be directed radially inward along vectors 36. As a result, the size of the cross-sectional opening 32 is reduced and the longitudinal passageway 30 is narrowed. The vectors 36 represent a force sufficient to retain the device 20 to a user greater than the user's weight.

Figure 4:
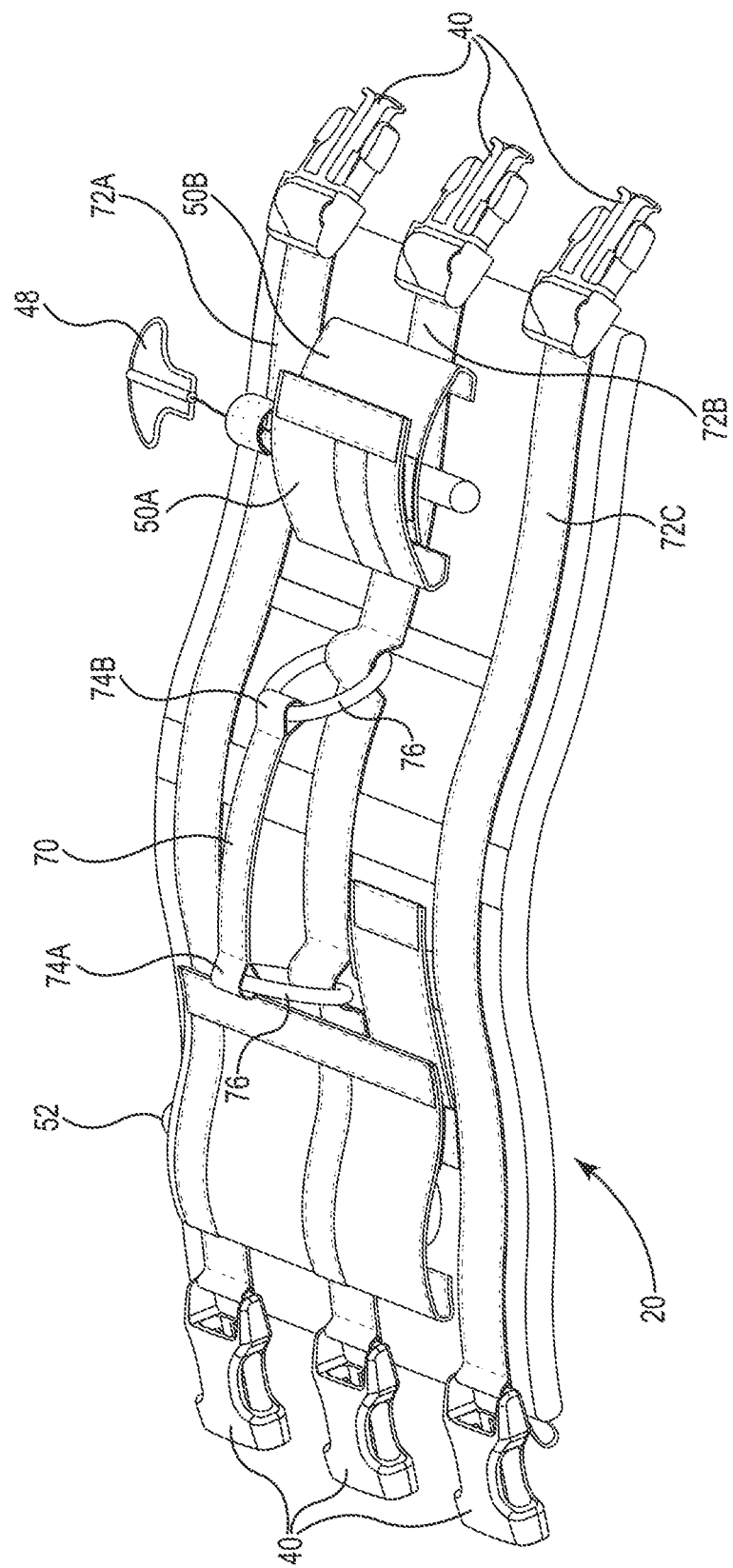

The size of the opening 32 can be adjusted using buckles 40 (see e.g., FIG. 4). The optimum opening, however, has a diameter between about 4 inches and about 16 inches so that no adjustment is needed, and inflation of the device 20 is sufficient to secure the device 20 to the majority of potential users.

In some embodiments, stiffening members 23, such as wire loops, are located in the protective covering 22 to retain the longitudinal passageway in the open configuration illustrated in FIG. 1. The stiffening members 23 facilitate positioning the rescue device 20 on the user, particularly during recovery operations when the user is either unconscious or dead.

FIGS. 4 and 5 illustrate the safety, rescue and recovery device 20 with the buckles 40 released and the in a flattened configuration. Inflator assembly 42 is attached to the protective covering 22 and fluidly coupled to the interior space 38 of the inflatable bladder 34. In embodiments without the protective covering 22, the inflator assembly 42 is attached to the bladder 34.

At least one gas canister 44 containing a compressed gas 46 is fluidly coupled to the inflator assembly 42. In one embodiment, lanyard 48 is used to activate the inflator assembly 42 to release the compressed gas 46 into the interior space 38. As discussed in connection with FIG. 18, an automatic activation system 45 may also be used to activate the inflation assembly 42.

Protective flaps 50A, 50B ("50") attached to the protective covering 22 extend over the inflator assembly 42 and gas canister 44. A suitable releasable attachment mechanism, such as Velcro, is used to retain the protective flaps 50 in the closed configuration illustrated in FIG. 4. In one embodiment, a spare gas canister 44A is provided, such as by attaching it to one of the protective flaps 50.

Optional manual inflation assembly 52 is fluidly coupled to the interior space 38 of the inflatable bladder 34. In the illustrated embodiment, the manual inflator assembly 52 includes elongated tube 54 with a proximal end 56 fluidly coupled with the interior space 38 of the inflatable bladder 34, a distal end 58 with a valve 60 to selectively add or release gas to the interior space 38. Protective flap 62 extends over the manual inflator assembly 52 when not in use. In an embodiment where the device 20 is used only for recovery, such as by divers recovering a body under water, the manual inflation assembly 52 is not required.

In either embodiment, the gas canisters 44 and the manual inflation assembly 52 provide the sole means of inflating the bladder 34. The resulting device 20 provides a self-contained system that relies on on-board mechanisms to inflate the bladder 34, and does not require an external source of compressed air to inflate the bladder 34. As used herein, "self-contained inflation system" refers to an on-board mechanisms that inflates a bladder of a safety, rescue, and recovery device. A self-contained inflation system expressly excludes the use of an external source of compressed air, such as an air hose.

Pressure relief valve 65 automatically releases the compressed gas 46 from the inflatable bladder 34 if a predetermined maximum pressure is exceeded. Lanyard 64 is provided to manually activate the pressure relief valve 65. Protective covering 66 extends over the lanyard 64 when not in use.

The protective covering 22 includes an elongated handle 70 attached to one of the reinforcing straps 72A, 72B, 72C that extend between the buckles 40. In the illustrated embodiment, each end 74A, 74B of the elongated handle 70 in attached to the reinforcing strap 72B by a metal rings 76. As best illustrated in FIG. 1, the elongated handle 70 extends circumferentially part way around the protective covering 22 generally perpendicular to the axis 78 of the longitudinal passageway 30.

Figure 16:
FIG. 16 illustrates use of a safety device in accordance with an embodiment of the present disclosure as a platform to grasp a victim.
Figure 17:
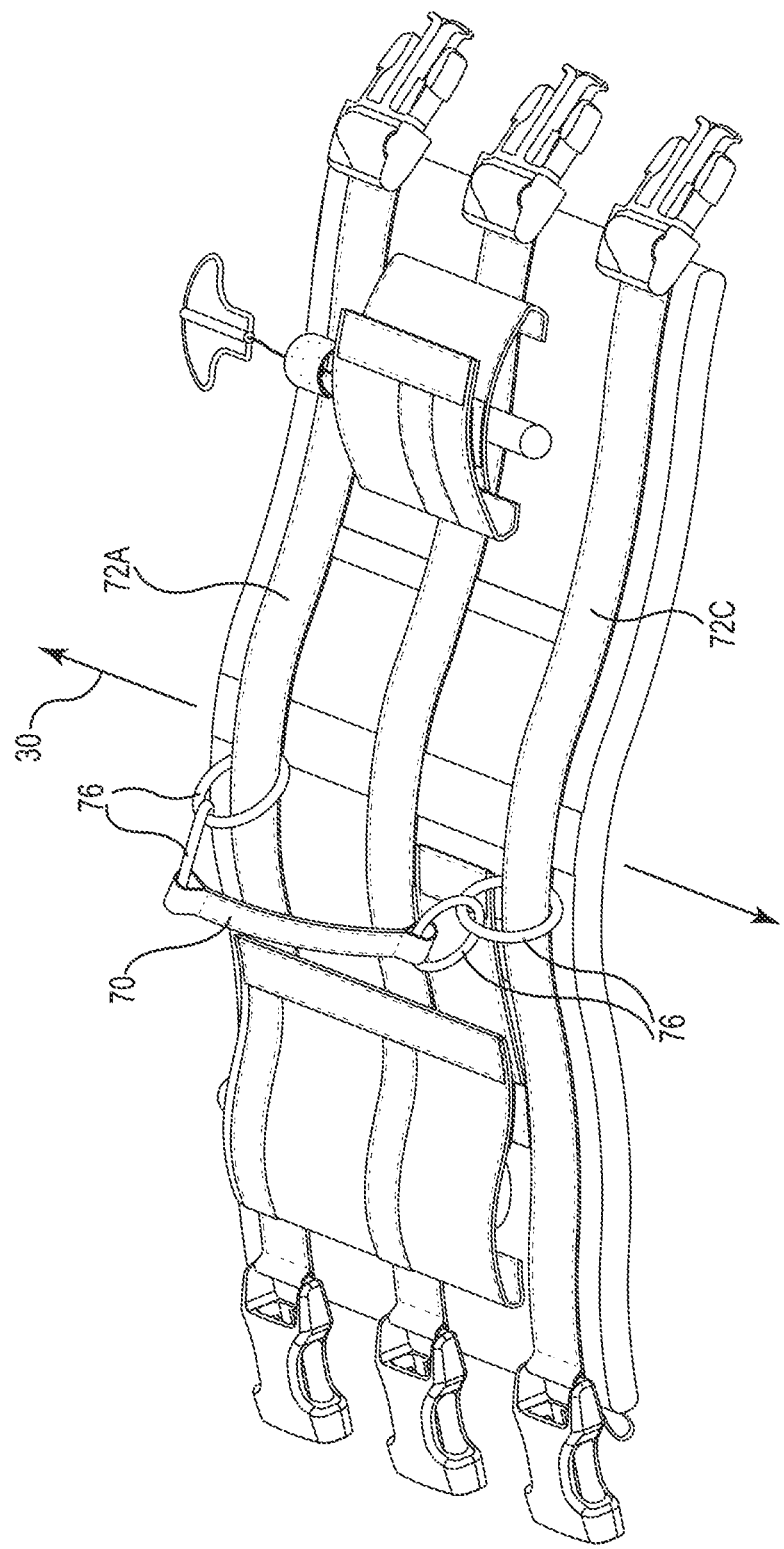
FIG. 17 illustrates an elongated handle oriented generally parallel to the longitudinal passageway in accordance with an embodiment of the present disclosure.

In an alternate embodiment illustrated in FIG. 17, a pair of metal rings 76 are attached to each of reinforcing straps 72A and 72C, respectively, and the elongated handle 70 is oriented generally parallel to the longitudinal passageway 30. The elongated handle 70 provides a sliding attachment point for rescue rope, as will be discussed herein. This configuration may also be better suited to manually gripping the handle 70 by hand (see FIG. 16), rather than attaching a rescue rope.

In one embodiment, the elongated handle 70 can be grasped directly by a first responder and used to drag a person to safety (see FIG. 16). For example, the device 20 can be positioned on a person, whether conscious or not, and inflated. Once secured, the elongated handle 70 provides a highly functional way to grab hold of a person to move them.

FIG. 18 illustrates an alternate of the device 20 of FIG. 5 with dual gas canisters 44A, 44B ("44") in accordance with an embodiment of the present disclosure. In the illustrated embodiment the gas canister 44A is activated using lanyard 48 as discussed herein.

In the illustrated embodiment, automatic activation system 45 is used to activate the inflation assembly 42 to release the compressed gas in gas canister 44B. The automatic activation system 45 is preferably coupled to the inflator assembly 42 so that the compressed gas in the gas canister 44B is released when certain conditions are met. Alternatively, the automatic activation system 45 can be incorporated directly into the inflation system 42, such as for example, a solenoid that advances a plunger 130 into the gas canister 44.

In one embodiment, the automatic activation system 45 is triggered remotely using an radio frequency signal, such as from transmitter 47. The transmitter 47 can be a dedicated device or a generic transmitter, such as a cellular phone. For example, in an embodiment where the automatic activation system 45 is a cellular device, a signal from a cellular tower triggers the inflation assembly 42. In alternate embodiments, the automatic activation system 45 is triggered after the elapse of a certain amount of time, upon contact with water, or when it is located in a designated location. For example, the automatic activation system 45 can include a location determining circuit, such as used in cellular phones or on global positioning devices. When the device 20 is positioned at a predetermined location the inflation assembly 42 is activated.

Figure 6B:
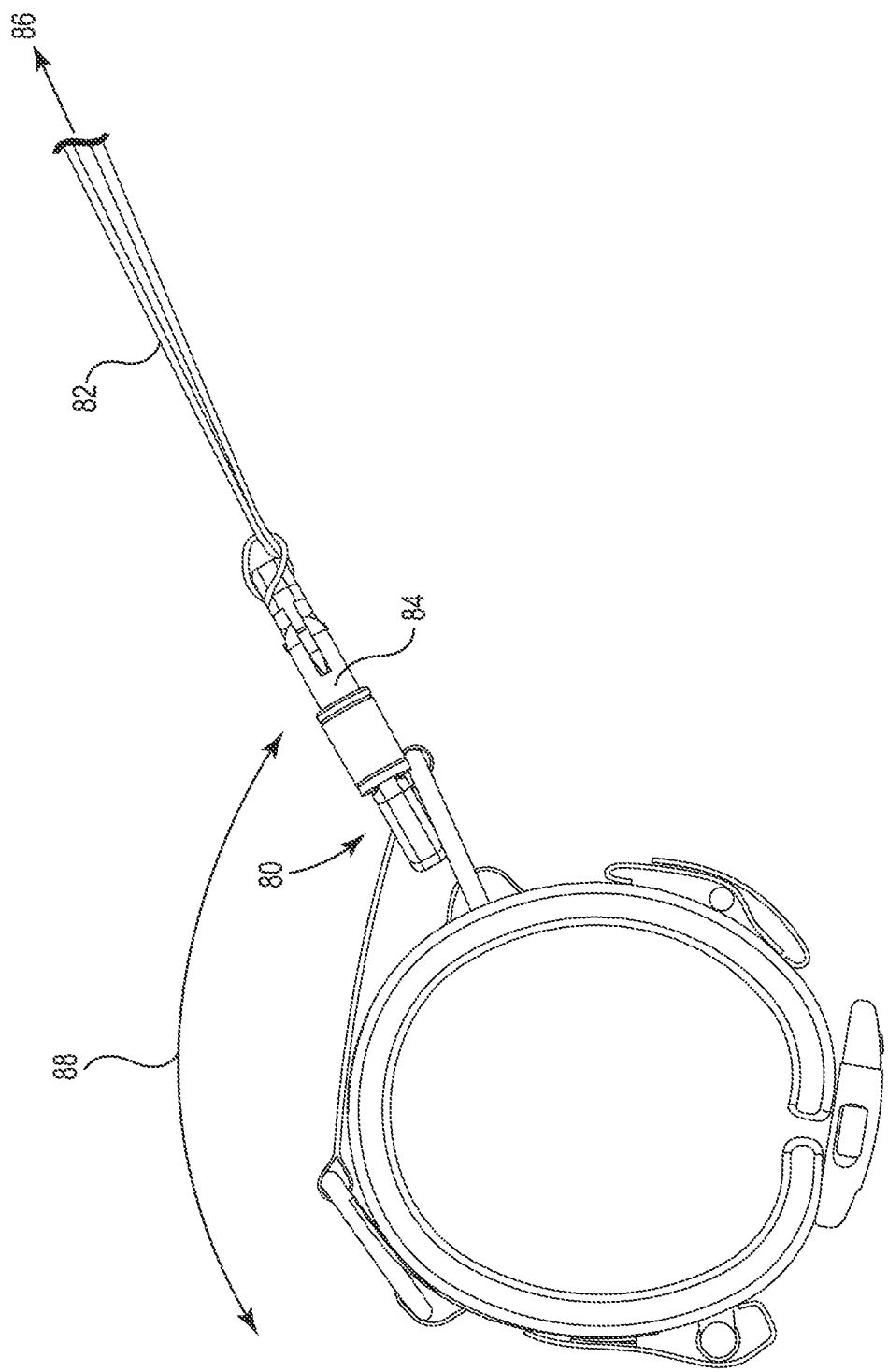

As best illustrated in FIGS. 6A and 6B, the configuration of the elongated handle 70 provides a sliding attachment point 80 for rescue rope 82. The sliding attachment point 80 operates in generally the same way for the embodiment of FIG. 17 or any other orientation of the handle 70 relative to the device 20.

The rescue rope 82 is attached to the longitudinal handle 70 by a carabiner 84 or other fastener with a fixed opening larger than the cross-section of the elongated handle 70. Consequently, a rescue force 86 applied to the rescue rope 82 can act on the safety, rescue and recovery device 20 at a variety of angles anywhere along arc 88. The arc 88 preferably extends about 60 degrees, and more preferably about 90 degrees, around the longitudinal axis 78 of the longitudinal opening 30.

During a rescue or recovery operation, the magnitude of the rescue force 86 must be sufficient to retrieve the user. For a large animal or person the rescue force 86 can be considerable and could potentially force the user being rescue into an unsafe orientation (e.g., face down) during rescue. The user being rescued must be configured in a safe orientation (e.g., face up) with respect to the rescue force 86 during the entire rescue operation.

The elongated handle 70 permits the sliding attachment point 80 to be adjusted dynamically during rescue operation to maintain the user being rescued in a safe orientation. The sliding attachment point 80 moves so that the rescue force 86 is directed along the path of least resistance. Consequently, the elongated handle 70 automatically reduces or minimizes torque applied to the limb of the user being rescued.

Alternatively, the rescue rope 82 can be attached to one of the metal rings 76 to provide a fixed attachment point.

Figure 7:
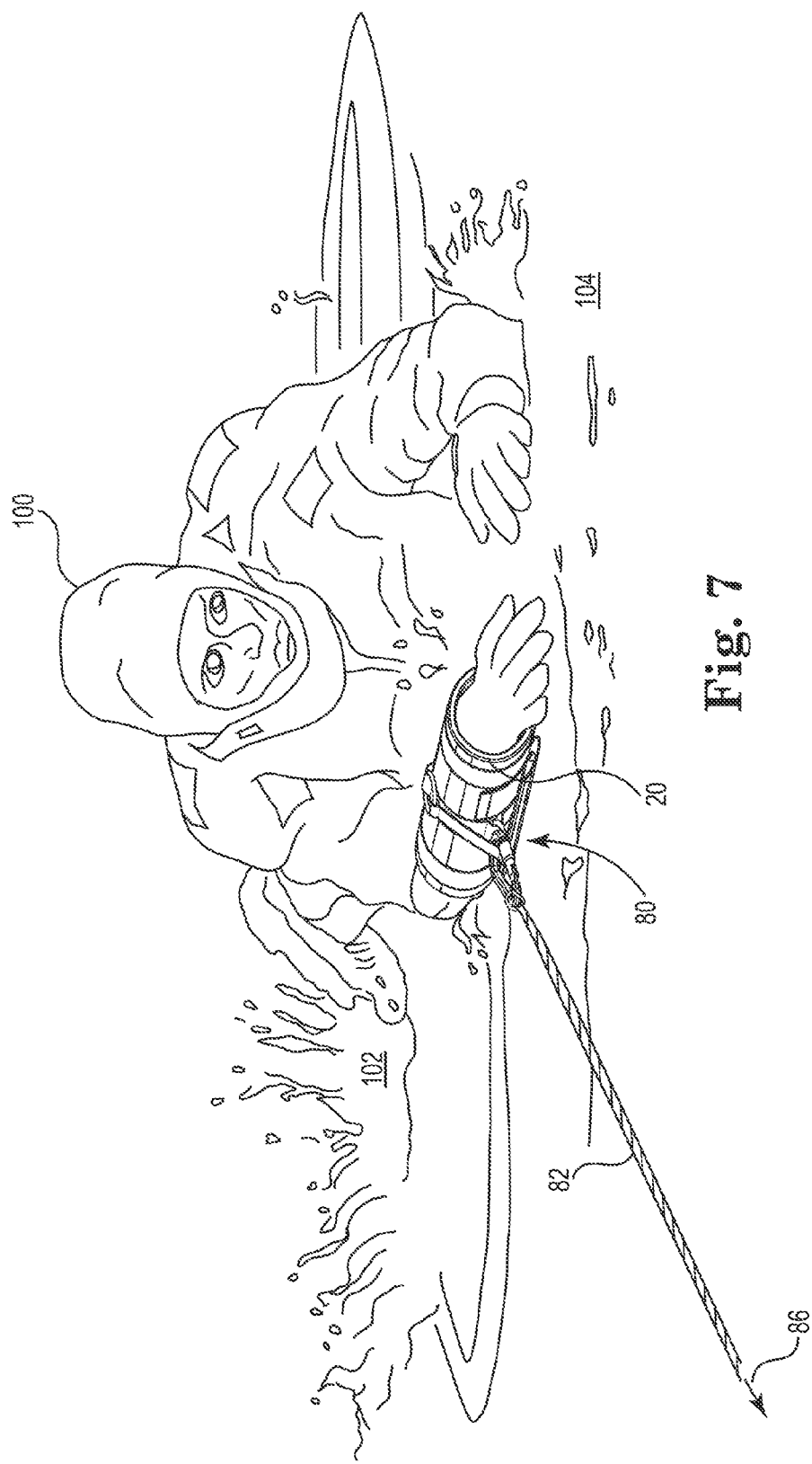
FIG. 7 illustrates use of a rescue device in accordance with an embodiment of the present disclosure to recover a person who has fallen through ice.

FIG. 7 illustrates an application of the elongated handle 70 during a rescue of a person 100 trapped in water 102 after having fallen through the ice 104. The sliding attachment point 80 of the rescue rope 82 relative to the rescue device 20 permits the person 100 to reposition himself relative to the rescue force 86 during the rescue operation.

Figure 8:
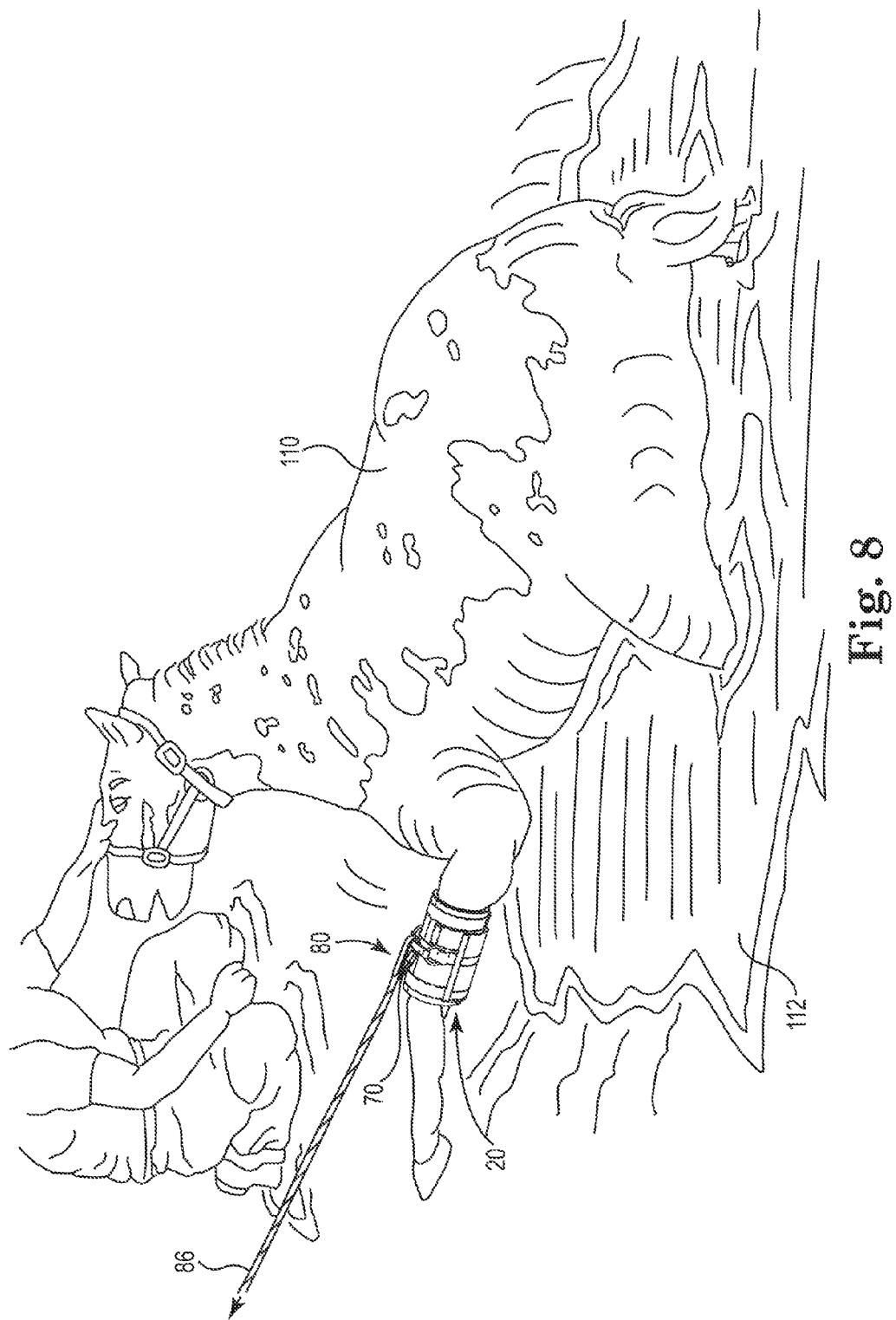
FIG. 8 illustrates use of a rescue device in accordance with an embodiment of the present disclosure to pull an animal to safety.

FIG. 8 illustrates an alternate application of the elongated handle 70 during a rescue of an animal 110 stuck in mud 112. As the animal is recovered, the direction of the rescue force 86 relative to the rescue device 20 is likely to change, and the sliding attachment point 80 permits this change in direction without pulling the animal 110 in an undesirable direction.

Figure 9A:
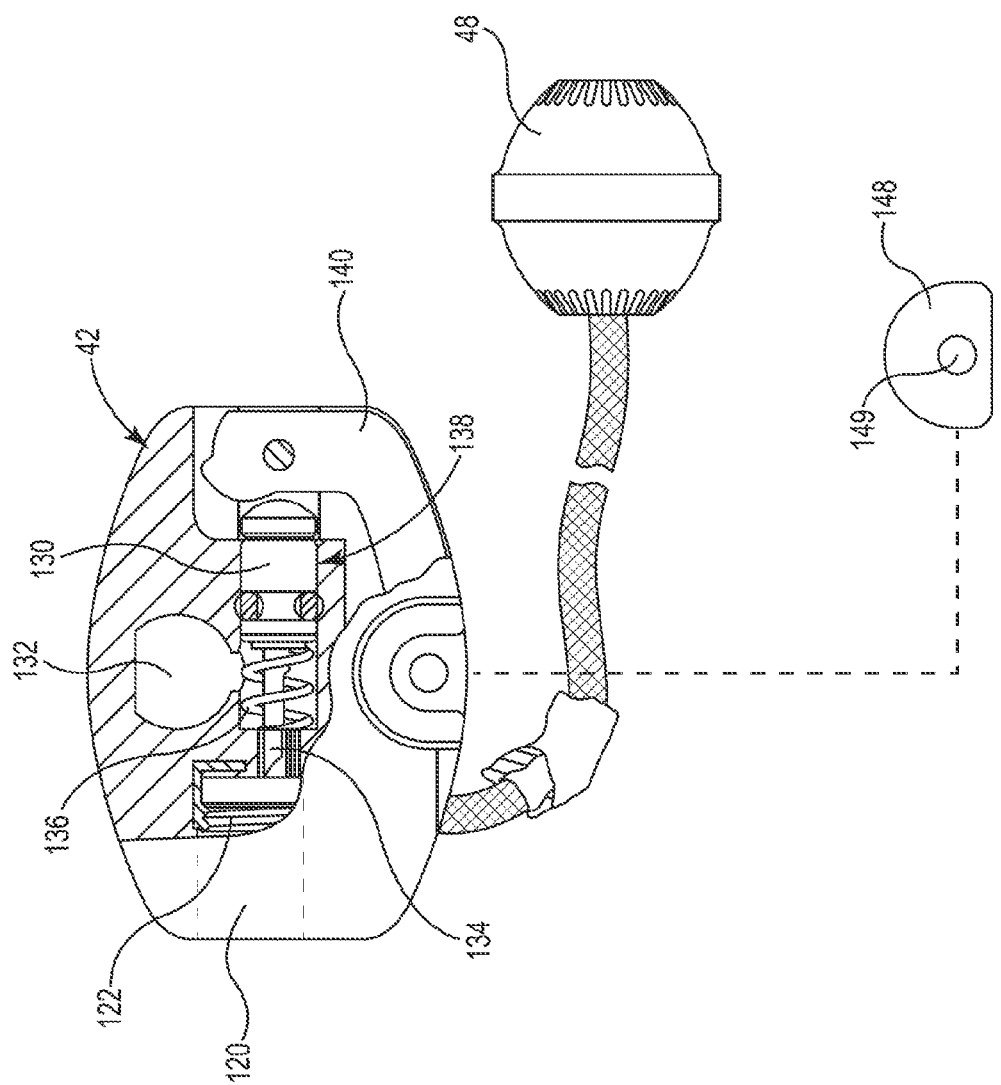
FIGS. 9A and 9B are various views of an inflator assembly in accordance with an embodiment of the present disclosure to pull an animal to safety.
Figure 9B:
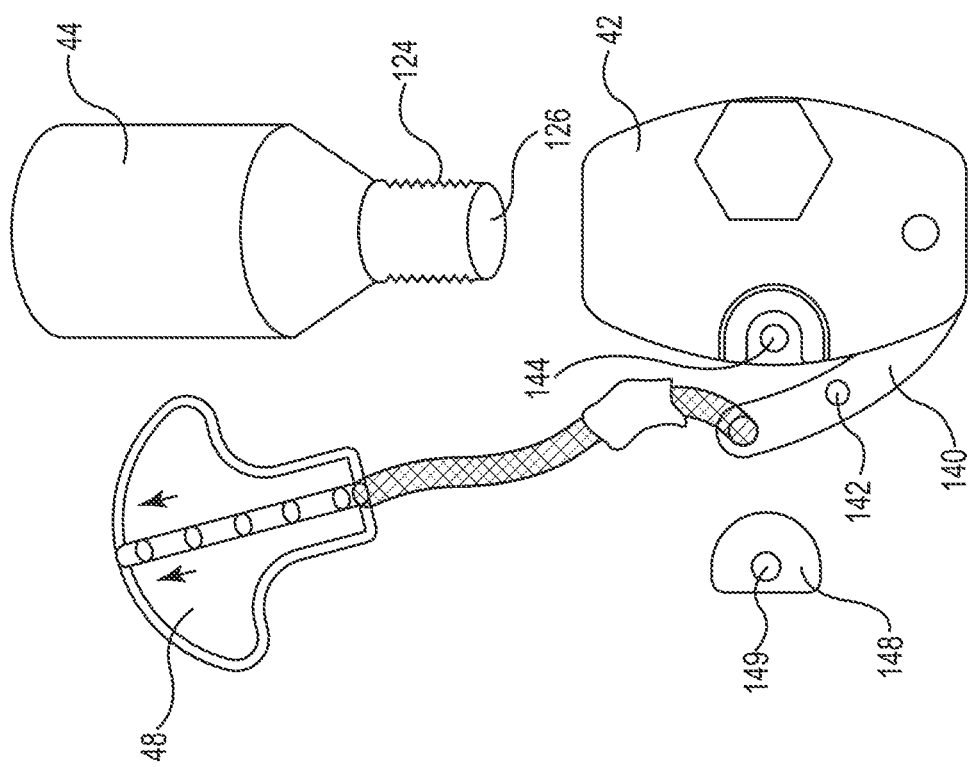

FIGS. 9A and 9B provide more details of the preferred inflator assembly 42 in accordance with an embodiment of the present disclosure. In the illustrated embodiment, the inflator assembly 42 includes a recess 120 with internal threads 122 corresponding to external threads 124 surrounding the end surface 126 of the gas canister 44. Alternatively, the gas canister 44 can be compressively engaged with the recess 120 using convention techniques.

Plunger 130 located in an interior space 132 of the inflator assembly 42 includes tip 134 positioned opposite the end surface 126 of the gas canister 44. Spring 136 retains the plunger 130 in a retracted position 138. The lanyard 48 is coupled to lever arm 140 that advances the plunger 130 to an extended position so that the tip 134 punctures the end surface 126 and release the compressed gas 46 into the interior space 132 of the inflator assembly 42.

Lever arm 140 preferably includes a hole 142 that aligns with the hole 144 in the housing 146 when in the retracted position 138. Indicator tab 148 includes pin 149 that is positioned in both holes 142, 144. When the lever arm 140 is advanced, the pin 149 is cut and the indicator tab 148 falls away to provide an indication that the plunger 130 has been previously deployed. A suitable inflator assembly is available from Halkey Roberts Corporation located in St. Petersburg, Florida, designated Model 840 Manual Inflator.

Figure 10A:
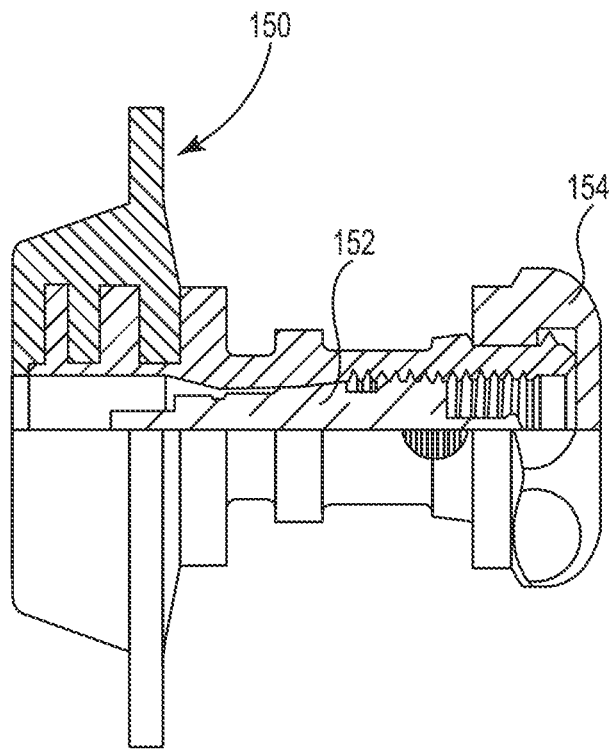
FIGS. 10A and 10B are various views of an manifold assembly in accordance with an embodiment of the present disclosure to pull an animal to safety.
Figure 10B:
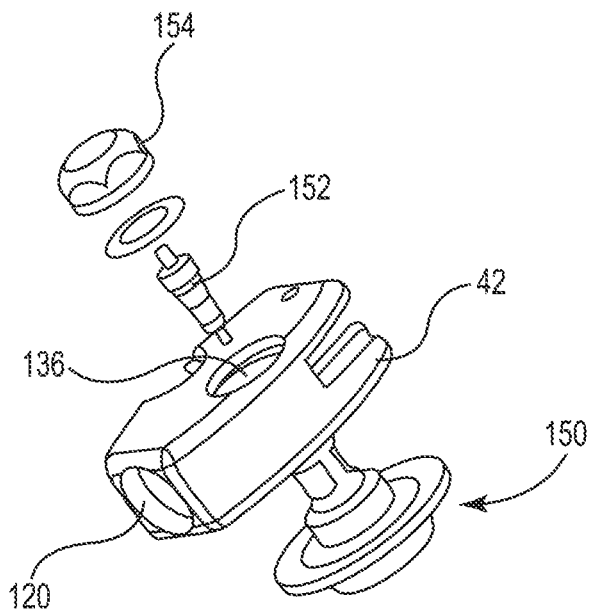

FIGS. 10A and 10B illustrate manifold assembly 150 that fluidly couples the interior space 132 of the inflator assembly 42 with the interior space 38 of the inflatable bladder 34. The manifold assembly 150 preferably includes a Teflon valve core 152 and cap nut 154 that attaches the assembly 150 to the inflator assembly 42 A suitable manifold assembly is available from Halkey Roberts Corporation, designated Model 830111001.

Figure 11A:
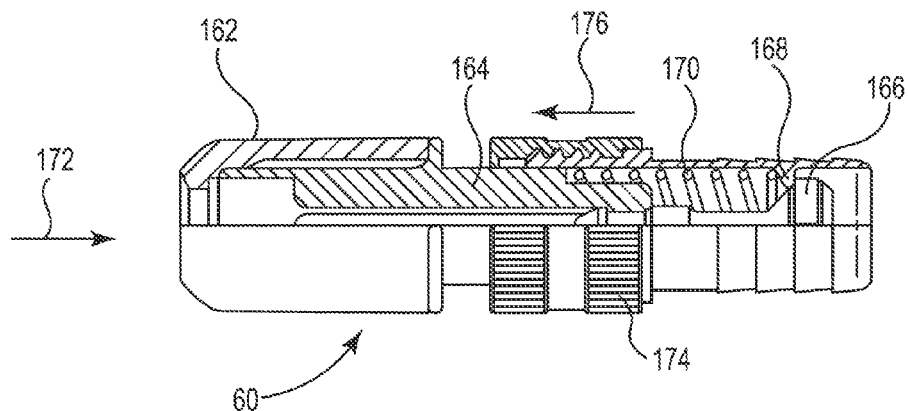
FIGS. 11A through 11C are various views of a manual inflation assembly in accordance with an embodiment of the present disclosure.
Figure 11B:
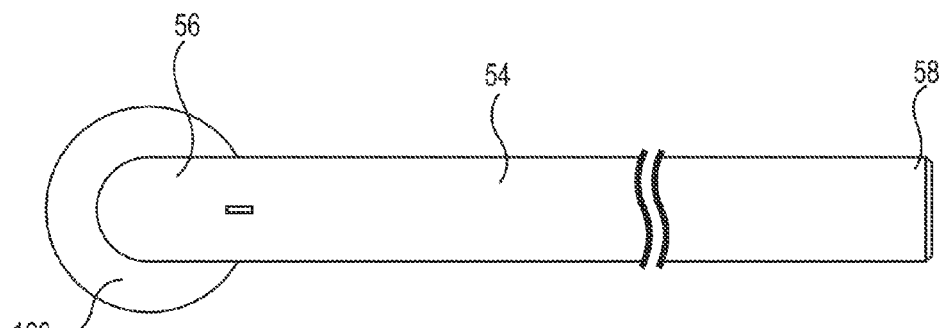
Figure 11C:
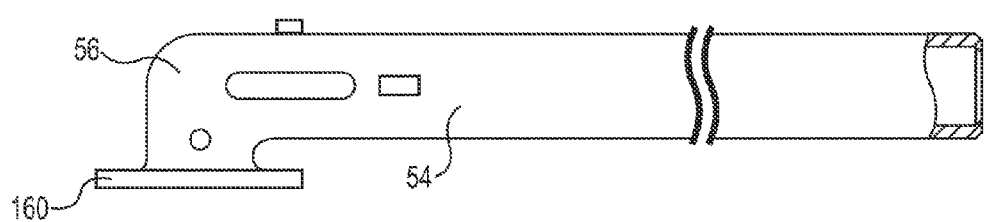

FIGS. 11A through 11C illustrate the manual inflation assembly 52 in accordance with an embodiment of the present disclosure. The proximal end 56 of the elongated tube 54 includes a flange 160 that seals to the inflatable bladder 34. The valve 60 includes mouth piece 162 attached to stem 164. The stem 164 includes gasket 166 that seals against shoulder 168. Spring 170 biases the stem 164 to retain the gasket 166 against the shoulder 168, closing the valve 60. Proximal end 178 of the valve 60 is designed to form a compression fit with proximal end 58 of the elongated tube 54.

In operation, the user pushes the mouth piece 162 in direction 172, which unseats the gasket 166 from the shoulder 168 and opens the valve 60. Air is manually blown through the mouth piece 162 and the elongated tube 54 into the inflatable bladder 34. When the mouth piece 162 is released, the spring 170 automatically closes the valve 60. Manual release of the valve 60 can also be used to release compressed gas from the inflatable bladder 34.

Sleeve 174 is threaded around the valve 60. Rotating the sleeve 174 advances it in the direction 176 to prevent the mouth piece 162 from moving in the direction 172, thereby locking the valve 60 in the closed position. A suitable manual inflator assembly is available from Halkey Roberts Corporation under designation 800ROL Oral Inflation Valve.

Figure 11D:
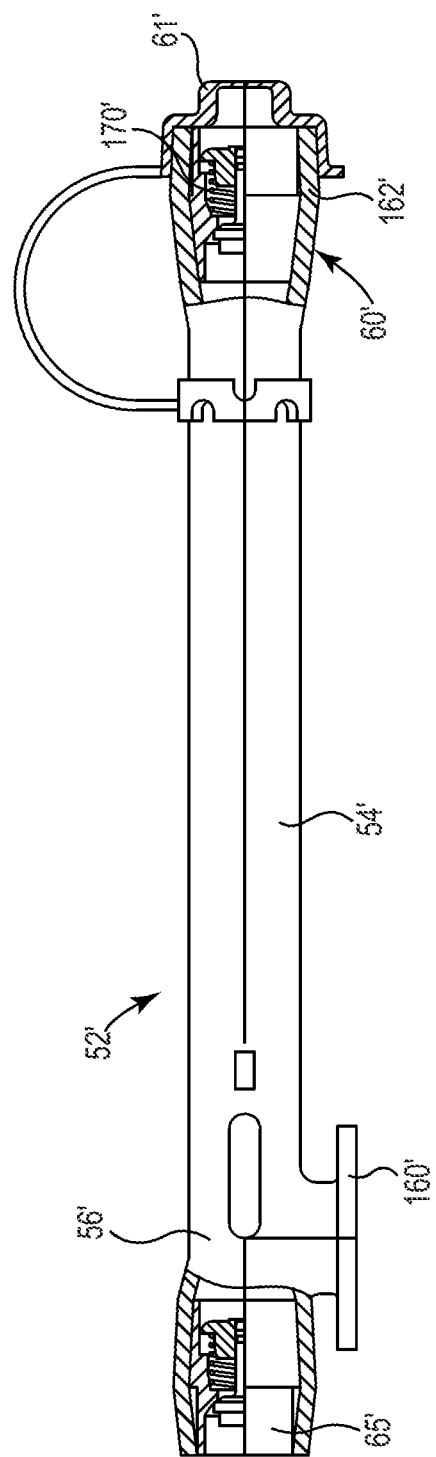
FIG. 11D is an alternate manual inflation assembly with integral pressure relief valve in accordance with an embodiment of the present disclosure.

FIG. 11D illustrates an alternate manual inflation assembly 52' with an integral pressure relief valve 65' in accordance with an embodiment of the present disclosure. The proximal end 56' of the elongated tube 54' includes a flange 160' that seals to the inflatable bladder 34. Pressure relief valve 65' located near the flange 160' automatically releases the compressed gas 46 from the inflatable bladder 34 if a pre-determined maximum pressure is exceeded. The valve 60' includes mouth piece 162'. Spring 170' biases the valve 60' to the closed position. Cap 61' covers the valve 60' when not in use. A suitable manual inflator assembly with integral pressure relief valve is available from Halkey Roberts Corporation under designation CV7300 Oral Tube/Relief Valve with Cap.

Figure 12:
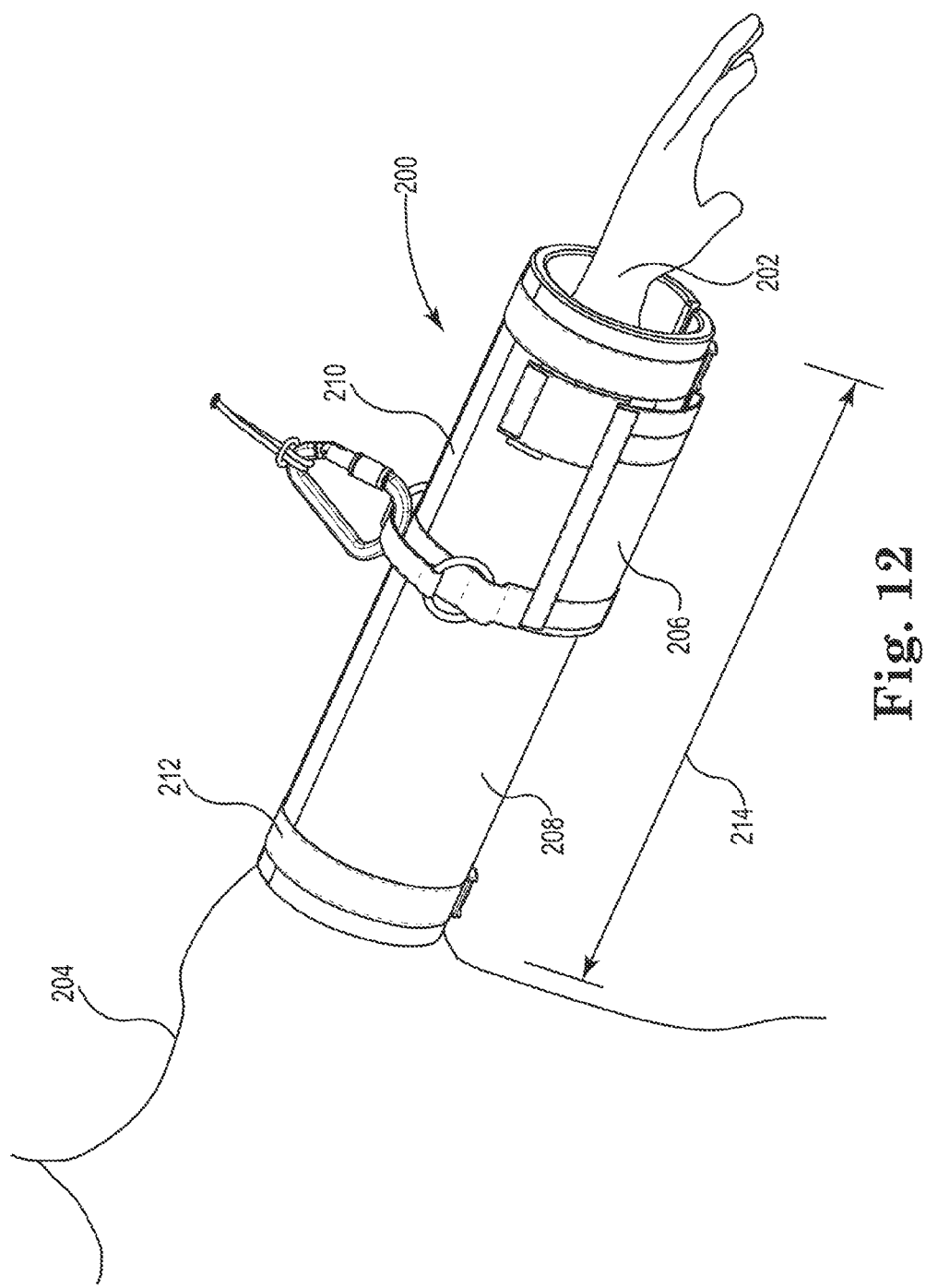
FIG. 12 illustrates an alternate safety, rescue and recovery device in accordance with an embodiment of the present disclosure.

FIG. 12 illustrates an alternate safety, rescue and recovery device 200 designed to extend across the elbow joint and substantially along the length of the arm 202 of the user 204. The device 200 typically has a length 214 of about 12 inches to about 20 inches. In one embodiment, the entire device 200 inflates, so as to act as a splint that immobilizes the arm 202. In another embodiment, only portion 206 extending along the forearm inflates and the portion 208 is merely an extension of protective covering 210. In one embodiment, cinching strap 212 secures the device 200 near the upper arm of the user. In another embodiment, the portion 210 attaches to a garment worn by the user (see e.g., FIG. 14).

Figure 13:
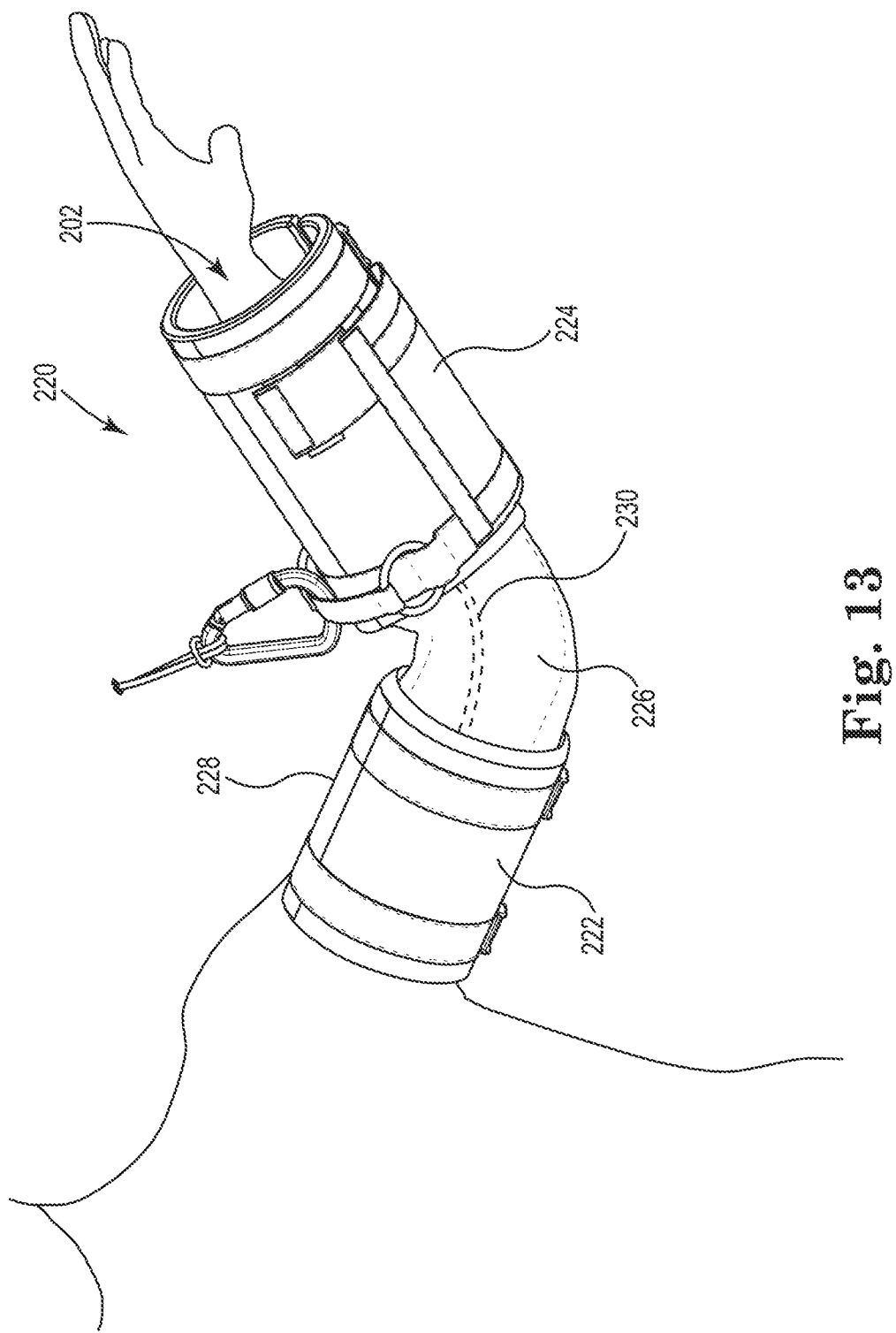
FIG. 13 illustrates another alternate safety, rescue and recovery device in accordance with an embodiment of the present disclosure.

FIG. 13 illustrates an alternate safety, rescue and recovery device 220 also designed to extend across the elbow joint and substantially along the length of the arm 202 of the user 204. In one embodiment, portions 222 and 224 both inflate, but portion 226 is an extension of the protective covering 228, which does not inflate. The portion 226 is preferably flexible to permit the user to flex the arm 202 at the elbow joint with minimal resistance. In one embodiment, portion 222 is inflated using the same inflator assembly (see e.g., FIGS. 4 and 5) located on the portion 224. For example, the inflatable bladders in the respective portions 222 and 224 can be fluidly coupled by tube 230. In another embodiment, each of the portions 222, 224 may include a separate inflator assembly.

Buoyancy of the various embodiments of the safety, rescue and recovery devices before the compressed gas is released from the gas canister is preferably adjusted depending on the application. Buoyancy refers to the ratio of an object's weight to the weight of the water it displaces. Objects whose density is greater than that of the water it displaces tend to sink (i.e., are negatively buoyant). Objects whose density is less than that of the water it displaces tend to float (i.e., positively buoyant). For rescue applications it is preferred that the device is positively buoyant even before release of the compressed gas (i.e., it floats). For recovery applications it may be necessary for a diver to carry the device underwater, so negative or neutral buoyancy may be preferred. Buoyancy can be controlled by adding or removing weight or a buoyant material from the device, pre-filling the inflatable bladder with a small amount of air, etc.

Figure 14:
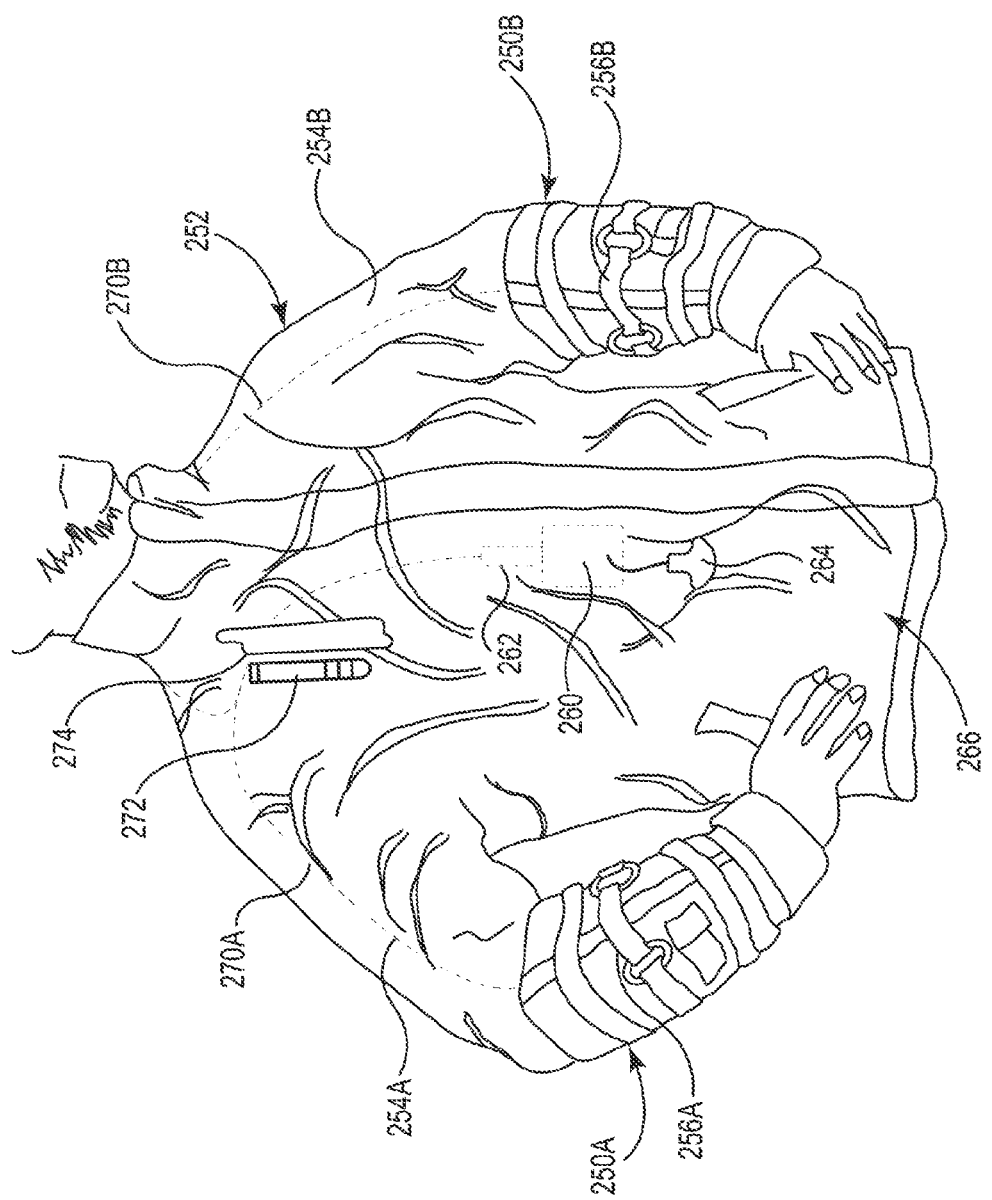
FIG. 14 illustrates a safety, rescue and recovery device incorporated into a garment in accordance with an embodiment of the present disclosure.

FIG. 14 illustrates an alternate embodiment in which one or more safety, rescue and recovery devices 250A, 250B ("250") are incorporated into garment 252. Any garment might be modified to include one or more of the devices 250, such as for example, garments for hunters, snowmobilers, ice fishermen, and the like.

In the illustrated embodiment, the garment 252 acts as the protective covering. The inflatable bladders (see e.g., FIG. 2) are integrated into the sleeves 254A, 254B ("254") of the garment 252. Elongated handles 256A, 256B ("256") are attached to each of the sleeves 254, respectively. In the illustrated embodiment, the inflator assembly 260, the gas canister 262 and the tether 264 are incorporated into the center region 266 of the garment 252 remote from the sleeves 254. Tubes 270A, 270B ("270") incorporated into the garment 252 fluidly couple the inflator assembly 260 to the devices 250, respectively. The same tubes 270 can be used to fluidly couple manual inflator assembly 272 to the devices 250. In the illustrated embodiment the manual inflator assembly 272 is also located remote from the devices 250. Protective covering 274 preferably extends over the manual inflator assembly 272 when not in use.

Figure 15:
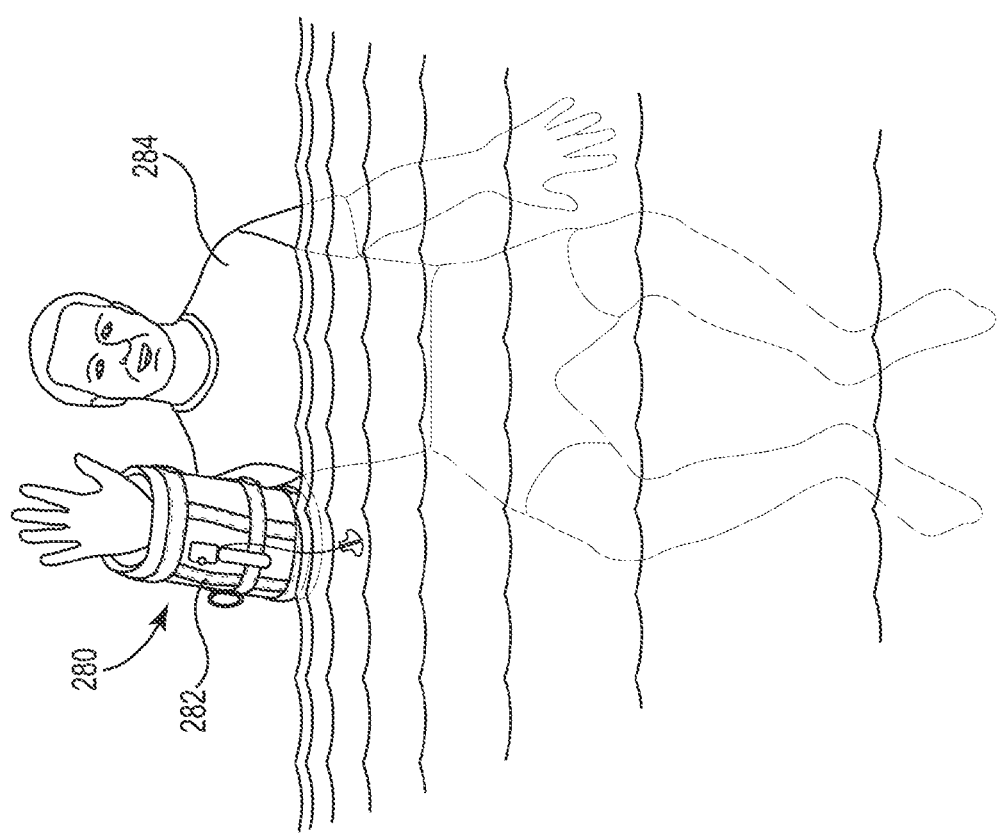
FIG. 15 illustrates a safety, rescue and recovery device in accordance with an embodiment of the present disclosure used as a floatation device.

FIG. 15 illustrates use of safety, rescue and recovery device 280 as a floatation device in accordance with an embodiment of the present disclosure. The device 280 in the inflated configuration 282 is sufficiently buoyant to support the user 284 indefinitely. The inflated configuration 282 is also sufficient to secure the device 280 on the user 284 without any other securing mechanism. That is, the pressure exerted on the user 284 by the inflated configuration 282 is the sole means of securing the device 280 to the user 284.

In operation, the device 280 is preferably positively buoyant before being inflated. As a result, the device 280 can be thrown to the user 284, where it floats on the water until it is positioned around the user's limb. Once in position, the user 284 activates the inflation device (see e.g., FIG. 5) or manually inflates the device 280 with the manual inflation assembly (see e.g., FIG. 5).

Where a range of values is provided, it is understood that each intervening value, to the tenth of the unit of the lower limit unless the context clearly dictates otherwise, between the upper and lower limit of that range and any other stated or intervening value in that stated range is encompassed within this disclosure. The upper and lower limits of these smaller ranges which may independently be included in the smaller ranges is also encompassed within the disclosure, subject to any specifically excluded limit in the stated range. Where the stated range includes one or both of the limits, ranges excluding either both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the various methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure is not entitled to antedate such publication by virtue of prior invention. Further, the dates of publication provided may be different from the actual publication dates which may need to be independently confirmed.

Other embodiments are possible. Although the description above contains much specificity, these should not be construed as limiting the scope of the disclosure, but as merely providing illustrations of some of the presently preferred embodiments. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form varying modes disclosed. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

What is claimed is:

1. A safety and rescue apparatus attachable to a limb of a user comprising:
  an inflatable bladder generally shaped as a hollow cylinder having, a first end, a second end, and a longitudinal passageway extending between the first end and the second end, the longitudinal passageway having a cross-sectional opening sized to receive the limb of the user in either the first end or the second end;

a protective covering substantially surrounding the inflatable bladder;
a self-contained inflation system including:
   at least one gas canister containing a compressed gas;
   an inflator assembly comprising a recess corresponding to an end surface of the gas canister, a plunger located in an interior space of the inflator assembly having a tip positioned opposite the end surface of the gas canister engaged with the recess, and an activation system coupled to the plunger to advance the tip into contact with the end surface to release the compressed gas into the interior space of the inflator assembly to compressively attach the safety and rescue apparatus to the limb of the user;
   a manual inflation assembly fluidly coupled with the interior space of the inflatable bladder;
a pressure relief valve fluidly coupled with the interior space that automatically releases compressed gas from the inflatable bladder if a pre-determined maximum pressure is exceeded; and
an elongated handle with first and second ends attached to the protective covering, the elongated handle offset from the protective covering to provide a sliding attachment point for a rescue rope that automatically reduces torque applied to the limb of the user regardless of the orientation of the safety and rescue apparatus relative to the user.

2. The safety and rescue apparatus of claim 1 wherein the manual inflation assembly comprises an elongated tube with a proximal end fluidly coupled with the interior space of the inflatable bladder, a distal end with a valve movable between an open position and a closed position, and a spring biasing the valve to the closed position.

3. The safety and rescue apparatus of claim 1 wherein the pressure relief valve is incorporated in the manual inflation assembly.

4. The safety and rescue apparatus of claim 1 comprising an automatic activation system coupled to the inflator assembly that releases the compressed gas in the gas canister when certain conditions are met.

5. The safety and rescue apparatus of claim 1 wherein the longitudinal passageway comprises a length of about 8 inches to about 20 inches.

6. The safety and rescue apparatus of claim 1 wherein the protective covering comprises a releasable covering extending over the manual inflator assembly.

7. The safety and rescue apparatus of claim 1 wherein the safety and rescue apparatus is neutrally or negatively buoyant before the compressed gas is released from the gas canister.

8. The safety and rescue apparatus of claim 1 wherein the protective covering comprises a generally hollow cylindrical shape having a first end, a second end, and a longitudinal passageway extending between the first end and the second end, the longitudinal passageway having a cross-sectional opening sized to receive the limb of the user.

9. The safety and rescue apparatus of claim 1 wherein the protective covering comprises one or more of a fire retardant material, a highly reflective material, or embedded photovoltaic cells that generate electricity when exposed to light.

10. The safety and rescue apparatus of claim 1 wherein the protective covering comprises stiffening members retaining the inflatable bladder in a generally cylindrical shape.

11. The safety and rescue apparatus of claim 1 wherein the protective covering comprises a sleeve of a garment.

12. The safety and rescue apparatus of claim 11 wherein one or more of the inflator assembly, gas canister, the manual inflation assembly, or the elongated handle are attached to the garment at a location remote from the inflatable bladder.

13. The safety and rescue apparatus of claim 11 comprising an inflatable bladder incorporated into each sleeve of the garment.

14. The safety and rescue apparatus of claim 1 wherein the elongated handle extends at least 60 degrees around the protective covering generally perpendicular to the longitudinal passageway.

15. The safety and rescue apparatus of claim 1 comprising an emergency beacon attached to the protective covering that is automatically activated when the inflator assembly is triggered.

16. The safety and rescue apparatus of claim 1 where the activation system is one of a manual activation system, an automatic activation system, or a combination thereof.

17. The safety and rescue apparatus of claim 1 comprising medical sensors located in the longitudinal passageway that monitor vital signs of the user.

18. A recovery apparatus attachable to a limb of a user comprising:
   a protective covering generally shaped as a hollow cylinder having a first end, a second end, and a longitudinal passageway extending between the first end and the second end, the longitudinal passageway having a cross-sectional opening sized to receive the limb of the user in either the first end or the second end;
   an inflatable bladder located within the protective covering;
   stiffening members retaining the protective covering in a generally cylindrical shape;
   a self-contained inflation system including:
      at least one gas canister containing a compressed gas and including an end surface;
      an inflator assembly comprising a recess corresponding to the end surface of the gas canister, a plunger located in an interior space of the inflator assembly having a tip positioned opposite the end surface of the gas canister engaged with the recess, and an activation system coupled to the plunger to advance the tip into contact with the end surface to release the compressed gas into the interior space of the inflator assembly to compressively attach the safety and rescue apparatus to the limb of the user;
   a pressure relief valve fluidly coupled with the interior space that automatically releases compressed gas from the inflatable bladder if a pre-determined maximum pressure is exceeded; and
   an elongated handle with first and second ends attached to the protective covering, the elongated handle offset from the protective covering to provide a sliding attachment point for a rescue rope regardless of the orientation of the recovery apparatus relative to the user;
   wherein the recovery apparatus is neutrally or negatively buoyant before the compressed gas is released from the gas canister.

19. A method of using safety and rescue apparatus attachable to a limb of a user, the method comprising the steps of:
   positioning the limb of the user in a longitudinal passageway of a protective covering, the protective covering having a shape generally as a hollow cylinder with a first end and a second end at opposite ends of the longitudinal passageway in either the first end or the second end;
   activating a self-contained inflation system that releases a compressed gas from a gas canister to inflate an inflatable bladder contained in the protective covering, the inflated bladder compressively attaching the safety and rescue apparatus to the limb of the user;

attaching a line to an elongated handle that is attached to the protective covering, the elongated handle offset from the protective covering to provide a sliding attachment point for a rescue rope; and applying tension to the line to retrieve the user, the sliding attachment point permitting the user to rotate relative to a tension axis of the line during retrieval rope to automatically reduce torque applied to the limb of the user regardless of the orientation of the safety and rescue apparatus relative to the user.

20. The method of claim 19 comprising configuring the safety and rescue apparatus to be one of neutrally buoyant, positively buoyant, or negatively buoyant before release of the compressed gas.

* * * * *